J. A. GRAFFT.
TRACTION ENGINE.
APPLICATION FILED MAR. 19, 1908.
917,590.
Patented Apr. 6, 1909.
2 SHEETS—SHEET 1.
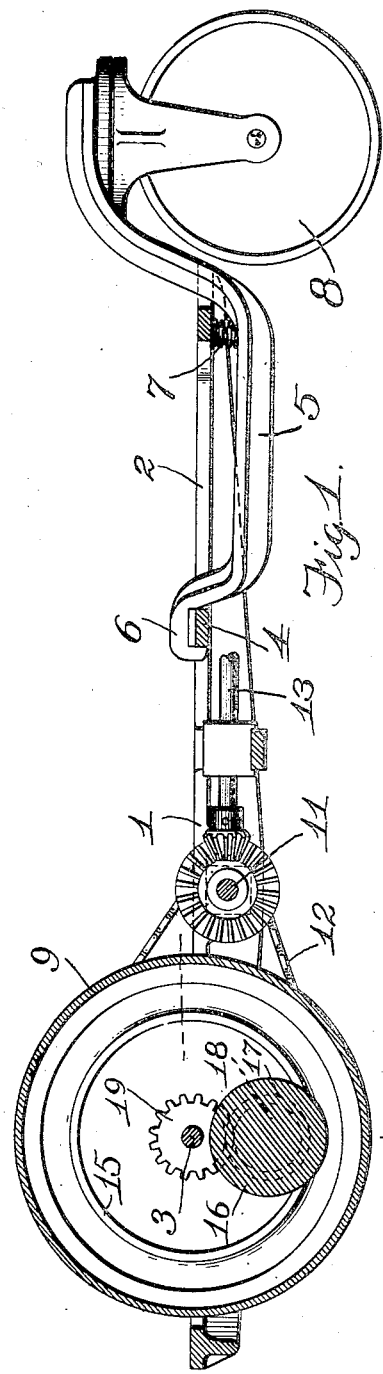
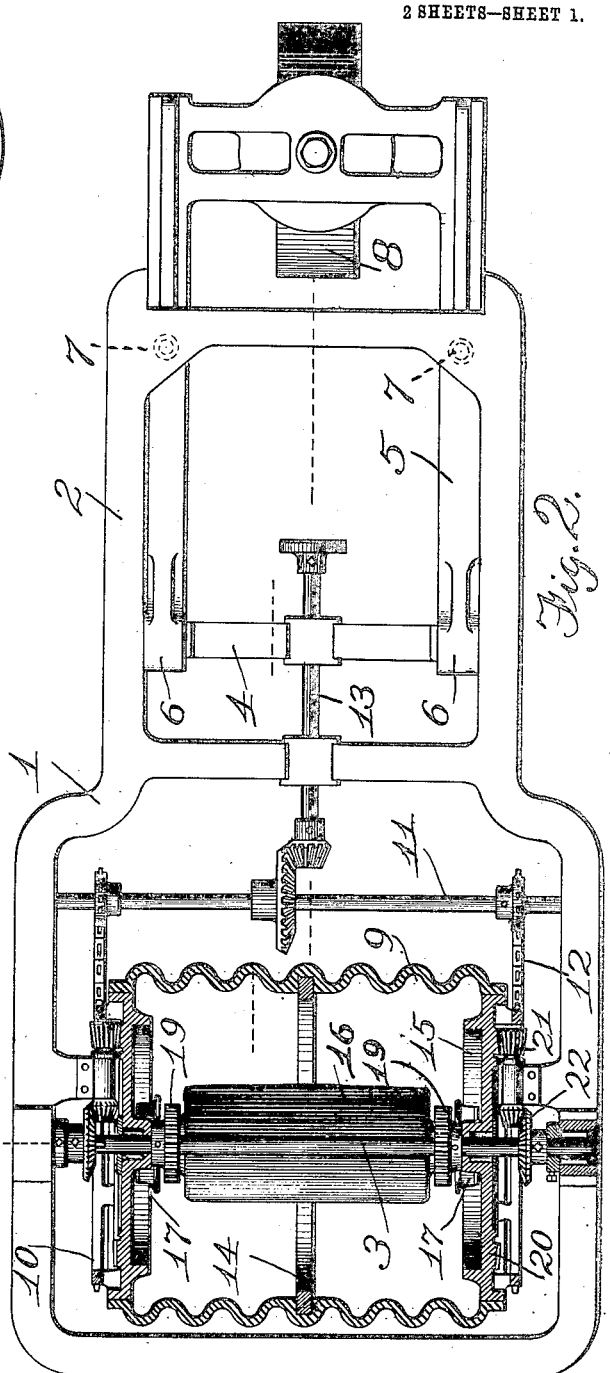
Witnesses:
Elmer R. Shipley.
M. S. Belden.
John A. Grafft Inventor
by James W. See
Attorney

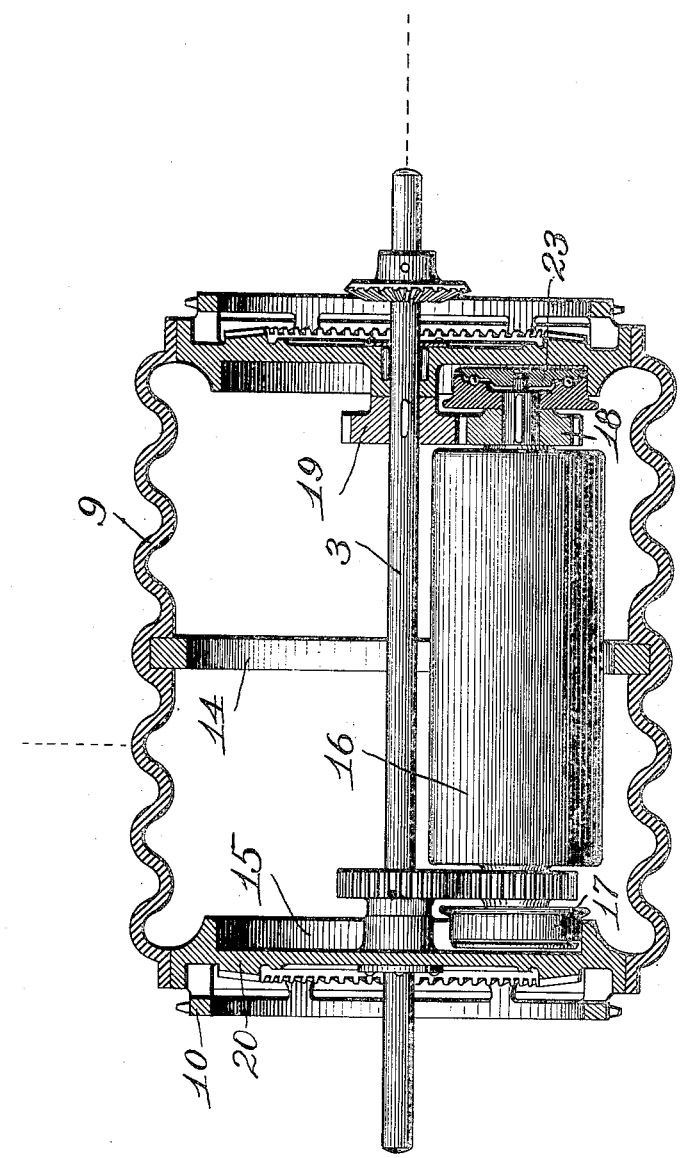

UNITED STATES PATENT OFFICE.

JOHN A. GRAFFT, OF HAMILTON, OHIO.

TRACTION-ENGINE.

No. 917,590.      Specification of Letters Patent.      Patented April 6, 1909.

Application filed March 19, 1908. Serial No. 421,978.

*To all whom it may concern:*

Be it known that I, JOHN A. GRAFFT, a citizen of the United States, residing at Hamilton, Butler county, Ohio, have invented certain new and useful Improvements in Traction - Engines, of which the following is a specification.

This invention, pertaining to improvements in traction engines, will be readily understood from the following description taken in connection with the accompanying drawings in which:—

Figure 1 is a vertical longitudinal section of the main portions of a traction engine exemplifying my invention; Fig. 2 a plan, part horizontal section, of the same; and Fig. 3 a vertical longitudinal section of the traction wheel upon a somewhat enlarged scale.

In the drawings:—1, indicates the main frame; 2, the forward portion of the main frame, on which portion the motor is to be mounted; 3, the rear axle, journaled in the main frame; 4, a cross-bar carried by the main frame to the rear of its forward end; 5, a fore-frame, disposed mainly below the forward portion of the main frame; 6, the rearward portions of the fore-frame, the same hooking over the cross-bar 4; 7, springs interposed between the fore-frame and the forward portion of the main frame; 8, a caster-wheel forming the front wheel and steering-wheel of the engine; 9, the traction wheel, in the form of a drum journaled on the rear axle, the periphery of this drum being circumferentially corrugated; 10, a sprocket-wheel carried by each end of the drum; 11, a counter-shaft journaled in the main frame parallel with the traction wheel; 12, sprocket-chains driven by sprocket-wheels on the countershaft and engaging the sprocket-wheels on the traction wheel; 13, the motor shaft, geared to the counter-shaft whereby rotary motion imparted to the motor-shaft becomes transmitted to the traction wheel; 14, a stiffening ring disposed inside the traction wheel, at about the middle of its length, to serve in stiffening the shell of the wheel; 15, a circular track carried by the inner surface of each head of the traction wheel, concentric with the axis of the wheel; 16, a heavy weight, preferably cylindrical in form, disposed within the traction wheel and extending lengthwise of the same below the rear axle; 17, a wheel on each end of the weight, these wheels engaging the circular tracks at the ends of the traction wheel; 18, a gear at each end of the weight; 19, gears fast on the rear axle, one gear engaging each of the gears 18 on the weight; 20, a bevel gear on the outer surface of each head of the traction wheel; 21, bevel gears journaled in the main frame, one pinion engaging each of the bevel gears 20; 22, bevel gearing connecting the bevel pinions 21 with the rear axle 3; and 23, a disk loose on each end of the weight exterior of the wheel 17.

While the traction wheel may appear as of such considerable width as to suggest that it represents a gage corresponding substantially with the gage of an ordinary pair of traction wheels, such is not the fact for, as compared with an ordinary gage, the wheel is comparatively narrow, indeed the present traction engine might be viewed as of the bicycle type incapable of stability if its masses have the ordinary disposition. It is the duty of the weight 16, in addition to increasing the traction force, to maintain the stability of the structure. The weight is massive and is disposed below the axis of the traction wheel. As the traction wheel rolls forward the weight, if able to roll freely in the circular tracks carried by the traction wheel, might depart forwardly or rearwardly from its true position, and the purpose of the gearing is to insure that the weight will always maintain its proper relationship to the axis of the traction wheel. As the traction wheel rolls forward it causes the axle 3 to turn, through the medium of gears 20, 21 and 22, and the rear axle, thus rotated, causes the weight, or the wheels at its ends to rotate, through the medium of gears 18 and 19. The gears are so proportioned that the coöperating surfaces of the circular tracks 15 and the wheels 17 will travel at the same rate, the result being that whether the traction wheel roll back or forward the weight will be compelled to occupy a constant relationship to the axis of the traction wheel and to the center of gravity of the general structure.

The corrugated form for the shell of the traction wheel results in lightness and strength and good tractive capacity and also in good provision against skidding. The presence of reinforcing ring 14 permits of a lighter wheel shell than would otherwise be practical.

The weight is rather massive and on side-hill traveling might exert undesired pressure against ends of the traction wheel, hence the provision of the loose disks 23 which engage the inner surface of the ends of the traction wheel and receive the end thrusts of the weight, the connection between these disks and the wheels 17 being preferably through the medium of ball-bearings. The motor, whatever its type, is to be carried by the forward portion of the main frame and transmit its motion to the traction wheel through the medium of the shafts and gearing and chains but it is to be understood that this particular system of transmission is merely typical, which is also the case with the particular system of gearing illustrated for the purpose of transmitting motion from the traction wheel to the weight wheels.

The juncture between the hooks 6 of the fore-frame and the main frame constitutes a joint of articulation permitting of vertical motion of the forward portion of the main frame relative to the front wheel, and the spring 7 endows this motion with elasticity thus avoiding, to considerable extent, the transmission of shocks to the motor carried by the main frame.

The particular construction illustrated is designed for general traction engine purposes and for such uses the traction wheel corrugated circumferentially is preferable, but it is manifest that for road rolling purposes the periphery of the traction wheel would be smooth or uncorrugated if that wheel were depended upon to do the rolling.

While the particular construction illustrated is, as has been explained, of rather narrow dimensions so as to be rather suggestive of a machine of the bicycle class, the fact will be readily appreciated that a number of the features of construction are applicable to machines of the usual or broad gage, or to machines having more than two wheels.

It is to be understood that the particular construction set forth is merely an exemplification of my invention. I have merely set forth the principle of my invention and the best mode in which I at present contemplate applying that principle.

I claim.

1. A traction engine comprising, a frame adapted to support a motor and to be supported by wheels, an axle mounted in the frame, a hollow traction wheel mounted on said axle, transmitting mechanism for conveying rotary motion to the hollow traction wheel from the motor, a circular track carried by the inner surface of each end of the traction wheel concentric with its axis, a weight disposed within the hollow traction wheel below the axle, wheels carried by the ends of the weight and having rolling engagement with said circular tracks, and gearing connecting said wheels and the traction wheel and serving to maintain said weight in constant relationship to the axle, combined substantially as set forth.

2. A traction engine comprising, a frame adapted to support a motor and to be supported by wheels, an axle mounted in the frame, a hollow traction wheel mounted on said axle, a circular track carried by the inner surface of each end of the traction wheel concentric with its axis, a weight disposed within the hollow traction wheel below the axle, wheels carried by the ends of the weight and having rolling engagement with said circular tracks, and transmitting mechanism connected with the traction wheel and with the wheels at the ends of the weight and adapted to transmit rotary motion simultaneously to the traction wheel and to the wheels at the ends of the weight so as to maintain the weight in constant relationship to the axle, combined substantially as set forth.

3. A traction engine comprising, a frame adapted to support a motor and to be supported by wheels, an axle mounted in the frame, a hollow traction wheel mounted on said axle, sprocket-wheels on the ends of the traction wheel, transmitting mechanism connected with said sprocket-wheels to serve in transmitting rotary motion from the motor to the traction wheel, a circular track carried by the inner surface of each end of the traction wheel concentric with its axis, a weight disposed within the hollow traction wheel below the axle, wheels carried by the ends of the weight and having rolling engagement with said circular tracks, and gearing connecting said wheels and the traction wheel and serving to maintain said weight in constant relationship to the axle, combined substantially as set forth.

4. A traction engine comprising, a frame adapted to support a motor and to be supported by wheels, an axle mounted in the frame, a hollow traction wheel mounted on said axle, transmitting mechanism for conveying rotary motion to the hollow traction wheel from the motor, a circular track carried by the inner surface of each end of the traction wheel concentric with its axis, a weight disposed within the hollow traction wheel below the axle, wheels carried by the ends of the weight and having rolling engagement with said circular tracks, transmitting mechanism connected with the traction wheel and the axle to cause them to turn simultaneously but independently, gears connected with the wheels carried by the ends of the weight, and gears fast on the axle and engaging the last mentioned gears and serving to maintain said weight in constant relationship to the axle, combined substantially as set forth.

5. A traction engine comprising, a frame adapted to support a motor and to be supported by wheels, an axle mounted in the frame, a hollow traction wheel mounted on said axle, transmitting mechanism for conveying rotary motion to the hollow traction wheel from the motor, a circular track carried by the inner surface of each end of the traction wheel concentric with its axis, a weight disposed within the hollow traction wheel below the axle, wheels carried by the ends of the weight and having rolling engagement with said circular tracks, gearing connecting said wheels and the traction wheel and serving to maintain said weight in constant relationship to the axle, and disks carried at the ends of the weight between the ends of the traction wheel and the outer faces of the wheels at the ends of the weight and adapted to make contact with the ends of the traction wheel when the weight shifts endwise, combined substantially as set forth.

6. A traction engine comprising, a frame adapted to support a motor and to be supported by wheels, an axle mounted in the frame, a hollow traction wheel mounted on said axle and having a circumferentially corrugated periphery, transmitting mechanism for conveying rotary motion to the hollow traction wheel from the motor, a circular track carried by the inner surface of each end of the traction wheel concentric with its axis, a weight disposed within the hollow traction wheel below the axle, wheels carried by the ends of the weight and having rolling engagement with said circular tracks, and gearing connecting said wheels and the traction wheel and serving to maintain said weight in constant relationship to the axle, combined substantially as set forth.

7. A traction engine comprising, a frame adapted to support a motor and to be supported by wheels, an axle mounted in the frame, a hollow traction wheel mounted on said axle and having a circumferentially corrugated periphery, a reënforcing ring engaging the inner portion of the shell of the traction wheel, transmitting mechanism for conveying rotary motion to the hollow traction wheel from the motor, a circular track carried by the inner surface of each end of the traction wheel concentric with its axis, a weight disposed within the hollow traction wheel below the axle, wheels carried by the ends of the weight and having rolling engagement with said circular tracks, and gearing connecting said wheels and the traction wheel and serving to maintain said weight in constant relationship to the axle, combined substantially as set forth.

8. A traction engine comprising, a main frame adapted to support a motor and to be supported by wheels, an axle mounted in the frame, a hollow traction wheel mounted on said axle, transmitting mechanism for conveying rotary motion to the hollow traction wheel from the motor, a circular track carried by the inner surface of each end of the traction wheel concentric with its axis, a weight disposed within the hollow traction wheel below the axle, wheels carried by the ends of the weight and having rolling engagement with said circular tracks, gearing connecting said wheels and the traction wheel and serving to maintain said weight in constant relationship to the axle, a fore-frame disposed below the forward portion of the main frame and projecting forwardly thereof, coupling devices flexibly connecting the rear portion of said fore-frame with the main frame, springs interposed between the fore-frame and the forward portion of the main frame, and a caster-wheel carried by the forward portion of the fore-frame, combined substantially as set forth.

JOHN A. GRAFFT.

Witnesses:
JAMES FITTON,
M. S. BELDEN.